United States Patent [19]

Niva

[11] Patent Number: 4,556,356

[45] Date of Patent: Dec. 3, 1985

[54] U-FRAME TRUCK

[75] Inventor: Karl-Erik Niva, Kiruna, Sweden

[73] Assignee: Kiruna Truck, AB, Sweden

[21] Appl. No.: 411,132

[22] Filed: Aug. 24, 1982

[30] Foreign Application Priority Data

Aug. 24, 1981 [SE] Sweden ............................ 8104988

[51] Int. Cl.[4] .............................................. B60P 1/16
[52] U.S. Cl. .................................. 414/458; 414/420; 414/498
[58] Field of Search ............... 414/420, 421, 458, 498; 254/124

[56] References Cited

U.S. PATENT DOCUMENTS

| | | | |
|---|---|---|---|
| 2,693,288 | 11/1954 | Black | 414/498 X |
| 3,378,155 | 4/1968 | Steiner | 414/420 X |
| 3,539,065 | 11/1970 | Brownell | 414/458 |
| 3,958,707 | 5/1976 | Deppe | 414/458 |
| 4,155,471 | 5/1979 | Yancy | 414/420 |
| 4,213,726 | 7/1980 | Robnett et al. | 414/420 |

Primary Examiner—Robert J. Spar
Assistant Examiner—Ken Muncy
Attorney, Agent, or Firm—Jones, Tullar & Cooper

[57] ABSTRACT

U-frame truck comprising a prime mover and a trailer having a U-frame opened backwards and including two parallel side frames and a connecting middle-frame portion. Three hydraulic cylinders are adapted to directly co-operate with special brackets adapted on the container to be transported. In this way an inner frame is eliminated, which up to now always has been used for supporting the container. This means a saving of weight and costs.

1 Claim, 7 Drawing Figures

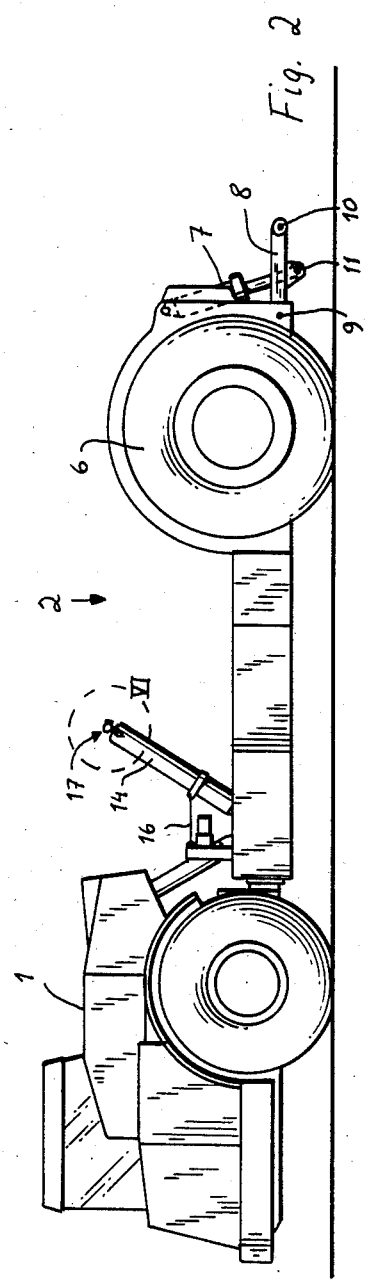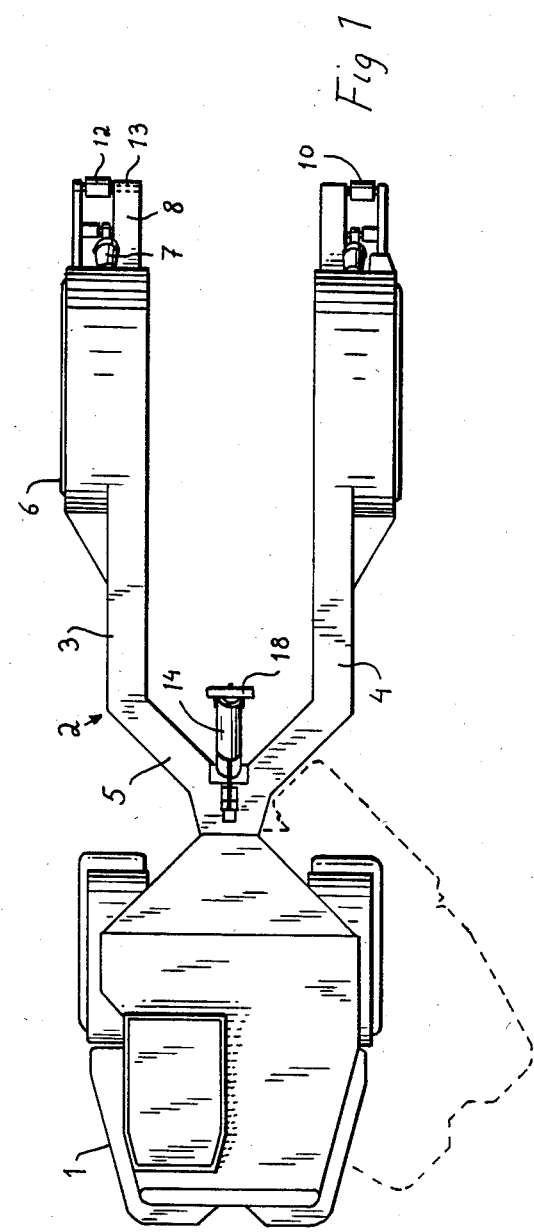

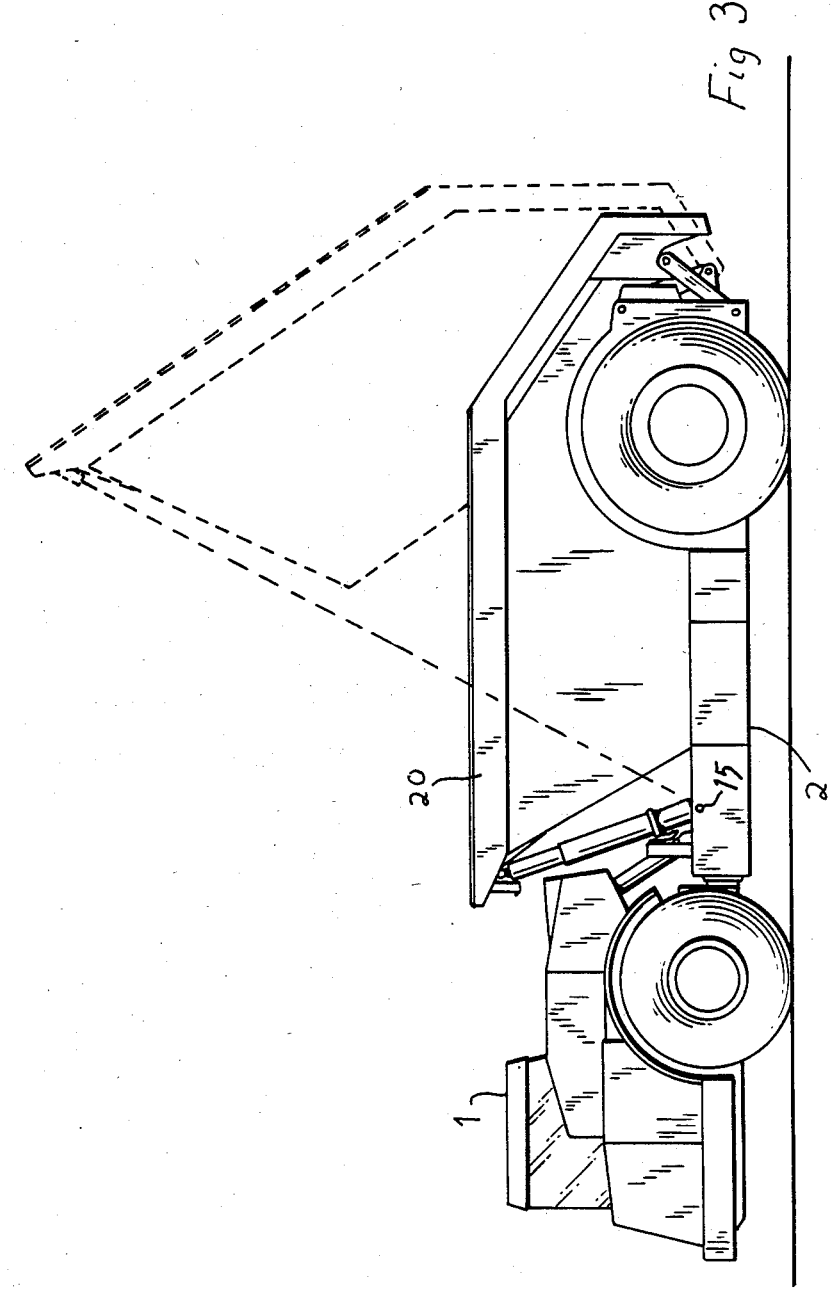

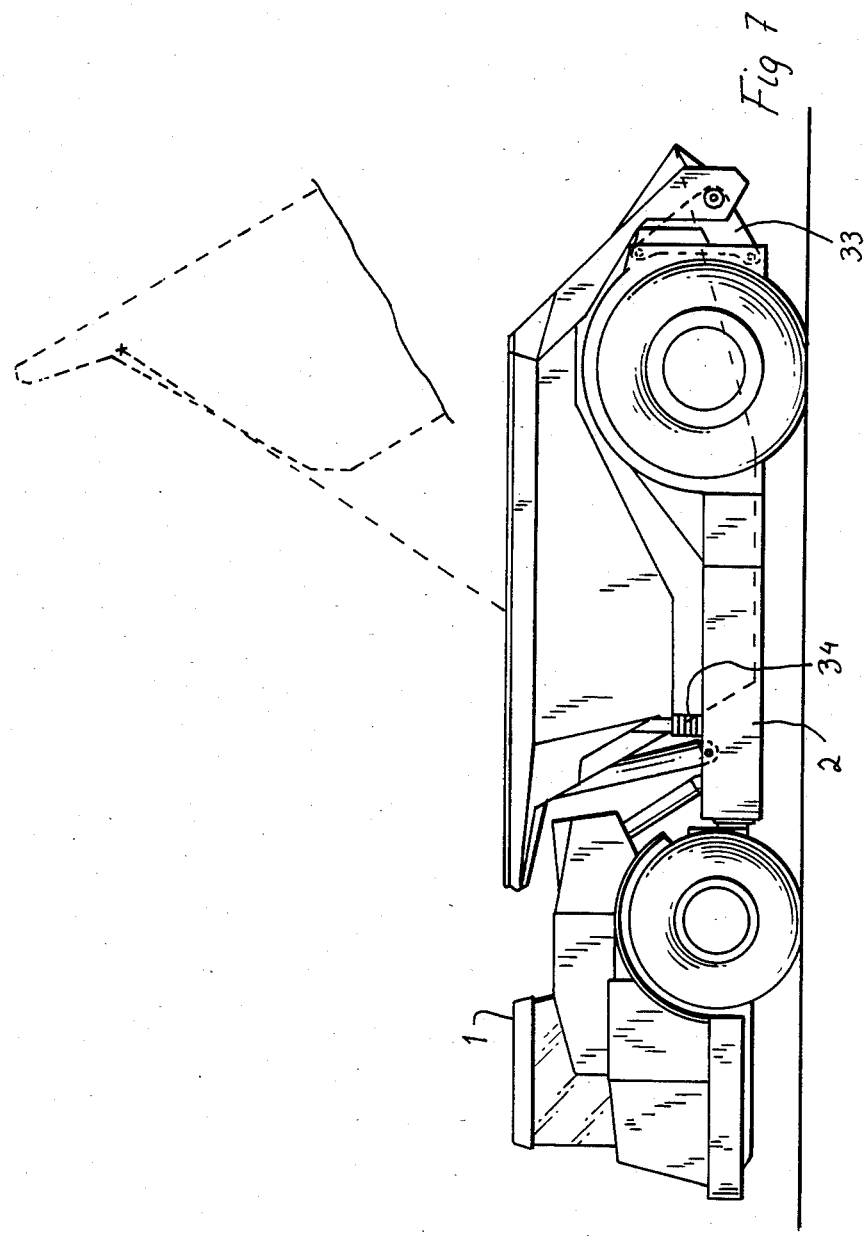

U-FRAME TRUCK

BACKGROUND OF THE INVENTION

The present invention relates to so-called U-frame trucks for handling and transportation of containers or receptacles.

The last 10 to 15 years such U-frame trucks have often been used at mining and steel-making plants. Our truck "Kiruna Combi K-250" is such a truck.

Such a truck comprises a prime mover including a motor and a transmission, and a trailer having an outer and inner U-shaped frame. The outer frame is connected to the prime mover and comprises the wheel assemblies and a couple of hydraulic cylinders, usually three or four. Two cylinders are placed at the back adjacent the open end of the frame, and one or two cylinders are placed at the front. The hydraulic cylinders carry or support the inner frame, which in turn supports the container. The hydraulic cylinders make the container tiltable.

At operation, the truck is simply driven such that it is moved backwards to a container standing on the ground. The open end of the U-frame is turned backwards and is moved backwards such that the U-frame will enclose the container at three sides. At this moment the inner frame is lowered to its lowest position. Thereupon, the hydraulic cylinders are activated and lift the inner frame such that it co-operates with the container at its border and lifts the container. The hydraulic cylinders are stopped in a transport position, where the container is lifted from the ground about half a meter.

It is understood that the container can be tilted by rising only the front hydraulic cylinders. The container is prevented from sliding down from the inner U-frame by suitable stop means.

SUMMARY OF THE INVENTION

The object of the present invention is to improve the above mentioned U-frame construction for the transportation of containers, such that the truck is lighter and is cheaper to manufacture.

According to the invention this object is achieved by eliminating the inner U-frame, which is intended to carry or support the container, and that the hydraulic cylinders are adapted directly to co-operate with the container at specially made brackets attached to the container. This is possible only if the container is sufficiently rigid to be self-supporting, which mostly is the case. The back lift points of the container are placed close to the tracks of the wheels of the U-frame in order to eliminate bending stresses on the side beams.

By eliminating the inner U-frame a substantial saving of costs and weight is achieved. The inner U-frame can have a weight of about 5 to 6 tons.

BRIEF DESCRIPTION OF THE DRAWINGS

The invention is described in closer detail below by means of a preferred embodiment which is shown on the drawings.

FIG. 1 is a plan view of the U-frame truck according to the invention.

FIG. 2 is a side view of the U-frame truck according to FIG. 1.

FIG. 3 is a side view similar to FIG. 2 but including a container supported by the U-frame truck according to the invention.

FIG. 7 is a side view showing the U-frame truck according to the invention transformed into a dumper.

DESCRIPTION OF PREFERRED EMBODIMENT

Figure 4:
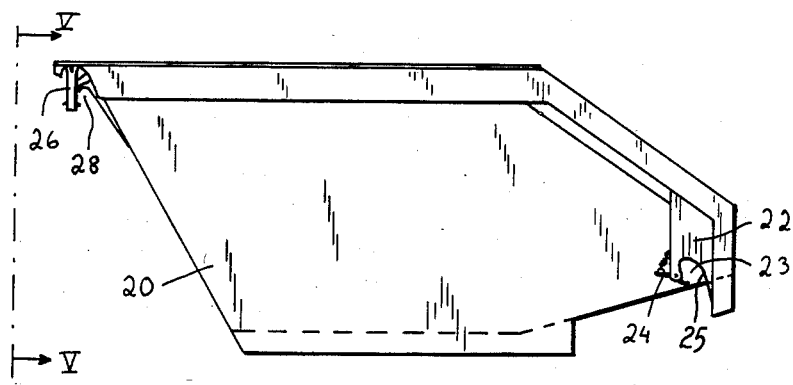
FIG. 4 is a side view showing the container provided with brackets for co-operation with the hydraulic cylinders of the U-frame truck.

FIGS. 1 and 2 show the U-frame truck according to the present invention. The truck comprises a prime mover 1 and a trailer 2 which are interconnected by a conventional universal joint and a transmission such that the U-frame truck forms a mid-articulated truck. The trailer 2 comprises two parallel side frame portions 3 and 4, which each comprises a wheel unit 6. The side frame portions 3, 4 are interconnected at the front portion of the trailer by means of a middle-frame portion 5, while the back portion of the trailer is open. Thus, the U-frame portions 3, 4 and 5 form a U-frame, hence the name U-frame truck.

At the back portion of each frame portion 3, 4 there is adapted a hydraulic cylinder 7, which best appears from FIG. 2. The cylinder acts upon a single-armed lever 8, which at one end is pivotably attached to the frame by means of a pin 9 and at its other end comprises an engagement means 10 for co-operation with a bracket, which is mounted on the container to be handled, which is further described below in connection with FIGS. 3, 4 and 5. The piston rod of the hydraulic cylinders is pivotably connected to the lever 8 close to its middle by means of a pin 11. The engagement means comprises a sleeve 12, which is rotatably journalled on a shaft 13. The engagement sleeve is positioned opposite the corresponding wheel unit 6, so that the side frame portion will not be torsionally stressed, i.e. so that bend stresses on the side beams are avoided.

At the front portion of the trailer, i.e. at the middle frame portion 5, a third hydraulic cylinder 14 is pivotally attached to the frame portion 5 by means of a pin 15. The hydraulic cylinder 14 is kept in the position shown by means of a belt 16, whereby the cylinder has an angle of about 60° to the horizontal. The piston rod of the cylinder 14 is provided with an engagement means 17 at one end for co-operation with the container. The engagement means comprises a horizontal rod 18, which is connected to the piston rod at its middle portion. Moreover, a guide flange 19 is connected to the rod 18.

Figure 5:
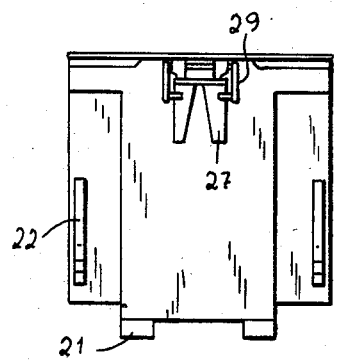
FIG. 5 is a side view taken according to the line V—V in FIG. 4.

In FIGS. 4 and 5 there is shown a container, which is adapted to co-operate with and be supported by the hydraulic cylinders 7, 14. The container is shown in side view in FIG. 4 and is a container 20 or receptacle customary used in the mining or steel-making industry. The container has two lower flanges 21 on which it stands.

At the back portion of the container at both sides of the container, brackets 22 are provided. The brackets are identical on both sides of the container and only one bracket is described below. The bracket 22 has an opening or slit 23, opening downwards and dimensioned and shaped for receiving the sleeve 12 of the engagement means 10 of the back hydraulic cylinders 7. The opening or slit is partially covered by a spring-biased lever 24, which aids to guide the sleeve 12 into and out of the opening and to retain the sleeve. Moreover, the bracket comprises a guide surface 25, which co-operates with the sleeve for guiding it into the opening.

Furthermore, the container comprises a centrally placed front bracket 26, the construction of which best appears from FIG. 5. The bracket has a guide surface 27, divided into two portions, which comprises a central groove, which guides the above-mentioned guide flange 19. The bracket has also a downwardly facing opening or slit 28, which is dimensioned and constructed for receiving the engagement means 17 of the front hydraulic cylinder 14. A lever 29 aids in guiding the rod 18 into and out of the opening 28 and maintains the rod in the opening during tilting.

The side brackets 22 are spaced from each other a distance which is approximately equal to the distance between the wheel units 6.

In FIG. 3 it is shown how the three hydraulic cylinders co-operate with the container. The trailer 2 of the U-frame truck is moved backwards so that the frame portions 3 and 4 are positioned at each side of the container, whereupon the hydraulic cylinders 7, 14 are in the position shown in FIG. 2. Thereupon, the piston rods of the back hydraulic cylinders 7 are retracted and the levers 8 are moved in an arcuate movement upwards to the position shown in FIG. 3. At the same time, the front cylinder 14 co-operates with the corresponding bracket 26 of the container. During the above-mentioned arcuate movement, the container is simultaneously moved a certain distance forward, whereupon the front cylinder is pivoted about its pin 15 and simultaneously is expanded somewhat so that the container is maintained essentially horizontal.

When the container should be tilted, the front hydraulic cylinder is expanded, which is shown in FIG. 3 with broken lines.

Figure 6:
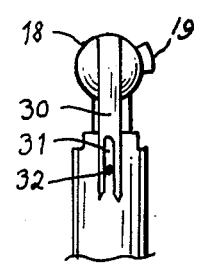
FIG. 6 is a detail view according to the circle VI in FIG. 2.

In FIG. 6 there is shown a detail view of the upper portion of the front cylinder. At the rod 18 there are welded two guide plates 30, which each includes a downwardly open slit 31. When the piston rod is retracted, the slits 31 co-operate with pins 32 welded to the housing of the cylinder assembly in order to maintain the rod 18 perpendicular to the longitudinal axis of the U-frame. In this way it is prevented that the rod 18 is pivoted and has difficulties to co-operate with the brackets 26 when a container is to be loaded.

It should be added that the U-frame truck according to the invention could be transformed into a conventional mid-articulated dumper, which is shown in FIG. 7. The two back hydraulic cylinders and the corresponding levers are removed and are replaced by two central tilt beams 33, which are attached in the connection points of the cylinders and levers. The beams 33 comprise slide bearings for pivotable attachment of a receptacle ordinarily used in a conventional dumper. The front end of the receptacle co-operates with the front hydraulic cylinder for tilting of the receptacle. The front portion of the receptacle can be provided with a rest plane, e.g. in the nature of two rubber buffers 34 for unloading of the cylinder in the transport position.

The feature of not needing an inner frame of the type which is used with a conventional U-frame truck, means a considerable saving of costs and weight compared to the present types.

It is realized that the object of the invention is achieved by the construction described above. The invention is not limited to the above-mentioned detail constructions but is only limited to the appended patent claim.

What we claim is:

1. A U-frame truck for lifting, transporting, and tilting a container, comprising:
   a prime mover;
   a trailer connected at its front end to said prime mover, said trailer having a U-shaped frame including parallel side frame portions and a connecting front middle-frame portion, said frame being open at its back portion;
   a wheel unit connected to each side frame portion;
   a back hydraulic cylinder mounted on each side frame portion and located adjacent the corresponding wheel unit;
   a single-armed lever pivotally mounted at one end to each said side frame portion each said lever having an outer free end including rear engagement means adapted to cooperate with a corresponding complementary-shaped rear bracket on the container for lifting, transporting, and tilting the container, said engagement means being so positioned on said side frame as to prevent torsional stress on said side frame by the container;
   at least one front hydraulic cylinder mounted on said middle-frame portion, said hydraulic cylinder having a piston rod carrying front engagement means adapted to cooperate with at least one complementary shaped front bracket on the container for lifting, transporting, and tilting the container;
   pin means pivotally attaching each said single-armed lever to the lowest portion of its corresponding side frame portion and behind said wheel unit, each said single-armed lever having a load position wherein it extends essentially horizontally to engage a corresponding low position engagement point on the rear bracket of the container, the engagement point being the lift and transport point for the rear of the container and the tilt center of the container upon tilting thereof by operation of the front cylinder; and
   means connecting each said back cylinder to a corresponding one of said single-armed levers, whereby said back cylinders are operative to lift said single-armed levers in an arcuate motion about said pin means, through an arc of about 45° so that the back engagement means of each single-armed lever remains behind the wheel units while lifting and transporting the container in cooperation with the front cylinder.

* * * * *